United States Patent [19]

Feustel

[11] Patent Number: 5,002,522

[45] Date of Patent: Mar. 26, 1991

[54] APPARATUS FOR CONTROLLING MACHINES FOR MAKING BAGS OR SACKS

[75] Inventor: Helmut Feustel, Köln, Fed. Rep. of Germany

[73] Assignee: Windmoller & Holscher, Lengerich, Fed. Rep. of Germany

[21] Appl. No.: 432,329

[22] Filed: Nov. 6, 1989

Related U.S. Application Data

[63] Continuation of Ser. No. 212,832, Jun. 29, 1988.

[30] Foreign Application Priority Data

Jul. 29, 1987 [DE] Fed. Rep. of Germany ....... 3721432

[51] Int. Cl.⁵ .......................... B31B 23/64; B31B 1/64
[52] U.S. Cl. ........................ 493/1; 493/193; 493/194
[58] Field of Search .................... 493/1, 2, 22, 24, 29, 493/193, 194, 195, 196, 197

[56] References Cited

U.S. PATENT DOCUMENTS

| | | | |
|---|---|---|---|
| 4,070,951 | 1/1978 | Bala | 493/24 |
| 4,216,705 | 8/1980 | Achelpohl et al. | 493/11 |
| 4,333,790 | 6/1982 | Schaffron | 156/510 |

FOREIGN PATENT DOCUMENTS

| | | |
|---|---|---|
| 0023117 | 7/1980 | European Pat. Off. . |
| 1779408 | 8/1968 | Fed. Rep. of Germany . |
| 2059630 | 4/1981 | United Kingdom ................ 493/196 |

*Primary Examiner*—William E. Terrell
*Attorney, Agent, or Firm*—Fleit, Jacobson, Cohn, Price, Holman & Stern

[57] ABSTRACT

An apparatus for controlling machines for making bags or sacks severed by welding from continuous tubular or semitubular films of synthetic thermoplastics has at least one pair of pinch rollers for feeding the continuous film. The pinch rollers are driven via a transmission by a first motor. A pair of welding jaws provides the continuous film with seam welds, transverse seam welds or severed transverse seam welds. A second motor actuates the welding jaws via a drive mechanism. A central processing unit controls the motors in such a manner that the motor for the pair of welding jaws is energized at a time when the motor for driving the pair of pinch rollers is still driving the pinch rollers, and after a standstill phase of the motor for driving the pair of pinch rollers the latter motor is energized even before the motor for driving the pair of welding jaws has stopped.

2 Claims, 3 Drawing Sheets

FIG.1

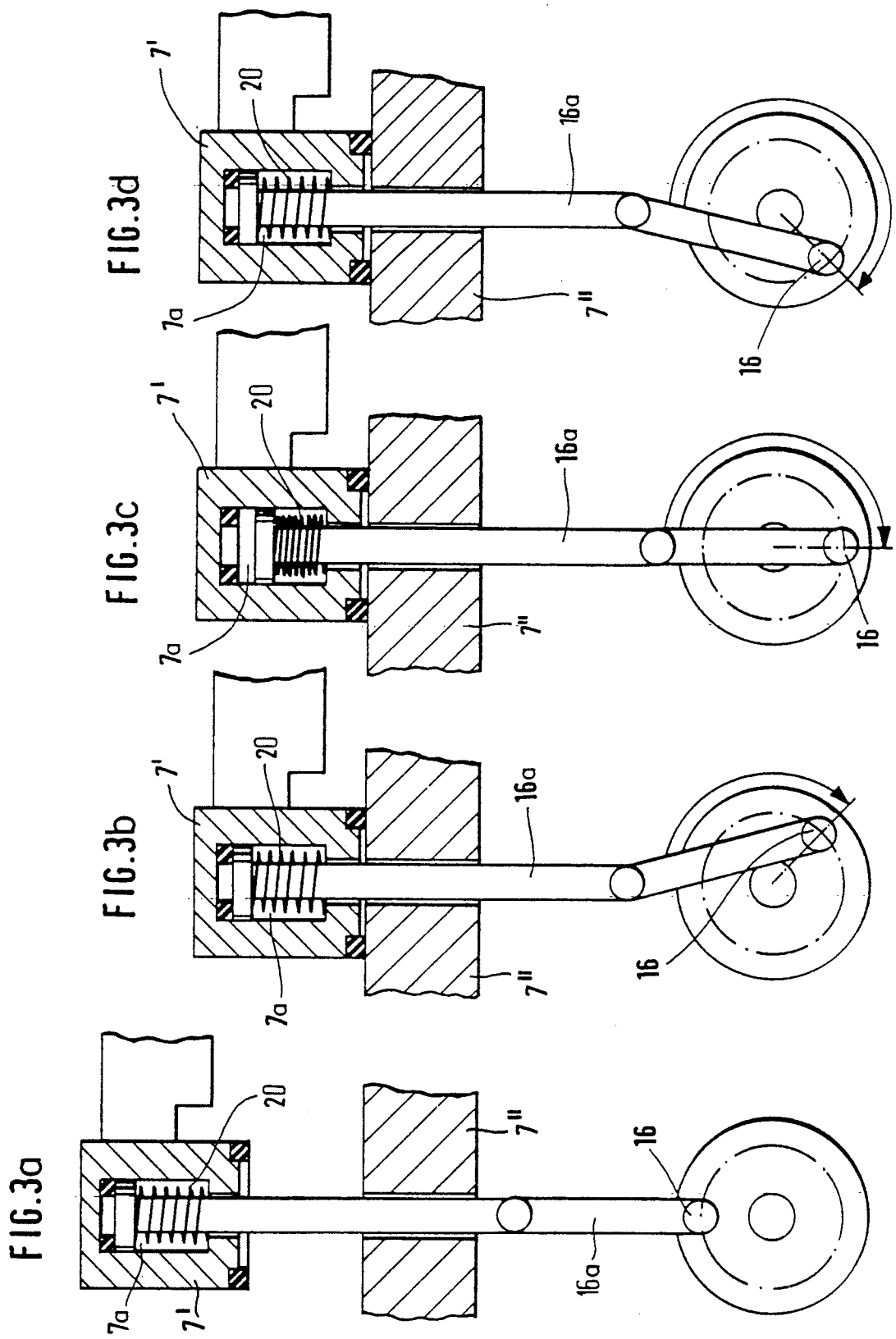

APPARATUS FOR CONTROLLING MACHINES FOR MAKING BAGS OR SACKS

This application is a continuation of application Ser. No. 212,832, filed June 29, 1988.

BACKGROUND OF THE INVENTION

1. Field of the Invention

This invention relates to an apparatus for controlling machines for making bags or sacks which have been severed by welding from continuous tubular or semitubular films of synthetic thermoplastics. The apparatus comprises at least one pair of pinch rollers for feeding the continuous films, which pinch rollers are driven via a transmission by a motor. The apparatus also comprises a pair of welding jaws for providing the continuous film with seam welds, which may be transverse seam welds or severed transverse seam welds, a second motor for actuating said pair of welding jaws via a drive mechanism, and optional further processing means, such as punching means, perforating cutters and the like, which are provided with drives.

2. Description of the Prior Art

The development of cyclically operating welding machines for making sacks or bags of synthetic thermoplastics has been restricted by the nature of the conventional drive means. Said drive means provided with mechanical control means fully complied with the requirements existing about 20 to 25 years ago because the plastic films to be processed then were in a phase of vigorous development so that objectives of processing technology were in the foreground.

But at the present time the development of the films has reached a rather final stage and further development of the processing machines has also continued so that boundaries can now be recognized. One boundary is imposed by the fact that the presently conventional machines comprise intercoupled drive means so that, e.g., the welding time and the feeding time of the film are interdependent.

Crank drives or crank-and-rocker linkages are normally used to drive the pinch rollers and the welding jaws.

Where a simple crank drive is used, the feeding time is approximately as long as the standstill time, which is determined by the drive which is coupled during the return stroke. In that one case the welding time need not be taken into account in the cycle because it amounts only to a fractional part of the return stroke time.

The production rate can be increased by the use of crank-and-rocker linkages. But also with such mechanisms, in which the duration of the return stroke is shorter than the duration of the forward stroke, the welding time amounts only to a fractional part of the standstill time so that there is also a loss of time, which reduces the production rate. Even where crank-and-rocker linkages are employed, the feeding time will depend on the standstill time and vice versa. Such dependence is due to the ratio which is determined by the design of the transmission. That unsatisfactory dependence will become apparent, e.g., if the machine is designed for optimum feed and standstill times for the making of bags of a given size. If in such a machine the feed length is doubled so that the feeding time will approximately be doubled too, the standstill time will also be doubled although the time required for welding will not be prolonged.

That dependence which is imposed by the coupled mechanical drives can be avoided in that separate drives are provided for the feed movement and for the welding jaws and said drives are separately controlled.

An apparatus of the kind described might be provided with separate motors, consisting, e.g., of stepping motors, for driving the pair of pinch rollers and the welding jaws, respectively, and said motors might be controlled by control means in such a manner that when the pair of pinch rollers have stopped, the last stepping pulse delivered to the stepping motor for driving the welding jaws, that motor will be operated by corresponding stepping pulses for the time which is required for making the seam welds and that time will not be dependent on the feed length and on the time required for feeding the film. When the stepping motor for driving the welding jaws has stopped, the next following stepping pulse can be delivered to the stepping motor for driving the pinch rollers so that the standstill times will not depend on the feeding times.

It has been disclosed in German Patent Specification 17 79 408 that the welding time can be changed in that welding jaws are driven by a crank drive and the means for driving said crank drive is stopped for a predetermined time when the crank drive is at its operating dead center.

SUMMARY OF THE INVENTION

It is an object of the invention to provide an apparatus of the kind described and the production rate of which can be further increased beyond one increase which is enabled by the provision of separate drives for the pinch rollers and the welding jaws, respectively.

The object is accomplished in that a central processing unit is provided, by which the motors are controlled in such a manner that the motor for the pair of welding jaws is energized even at a time at which the motor for driving the pair of pinch rollers is still energized to drive the pair of pinch rollers and after the standstill phase of the motor for driving the pair of pinch rollers, the latter motor is energized even before the motor for driving the pair of welding jaws has stopped. It is a basic concept of the invention to start the drive for the welding jaws before the feeding stroke has been entirely completed. As a result, contact between the welding jaws and the continuous film to be provided with seam welds will be effected immediately after the continuous film has stopped. Moreover, the pinch rollers for feeding the continuous film are started as soon as the welding jaws have just cleared the continuous film but have not yet been arrested. It is apparent that in the apparatus in accordance with the invention the production rate will be increased through utilization of the times required for the movement of the welding jaws to and from their welding position.

Because the respective drives for the pinch rollers and the welding jaws are not coupled to each other in an apparatus in accordance with the invention, the production rate will be increased not only by the fact that the standstill times do not depend on the feeding times but consist only of the welding times proper, but the production rate will further be increased by the fact that the operating times of the motors overlap each other in part so that an optimum production rate can be achieved and unproductive times can be avoided.

If the production machine is provided with optional further processing means, such as punching means-perforating cutters or the like, the drives for such further processing means may also consist of motors which are energized at times that at least partly overlap the processing cycle consisting of the feeding time and the welding time.

Within the scope of the invention, each processing station maybe provided with a separate motor and transmission and it is essential that the motors for the respective processing stations are energizable for times which at least partly overlap each other.

The drives for operating the welding jaws of welding devices usually comprise crankshafts and the welding time corresponds to the so-called clamping time. An adjustable part of each revolution of the crankshaft is utilized for the welding operation, which owing to elastic means is accompanied by a clamping action. The remaining part of the revolution is used to lift the welding jaws and to move them back to the film to be welded. In known machines the crankshaft rotates at a constant speed to perform one revolution per machine cycle. As in known machines, the adjusted angular movement for performing the clamping action remains constant, the actual welding time will always depend on the current cycle frequency.

An optional feature of the invention resides in that the drive for the welding jaws may consist of a crank drive, which is adapted to perform a clamping action, and for a control of the welding times the motor for driving said crank drive is adapted to be controlled in such a manner that said motor can be decelerated and-/or intermittently stopped during each revolution. Because separate drives are provided for feeding the continuous film and for welding the film, and said drives are separately controlled, a predetermined, uniform welding time can always be selected regardless of the cycle frequency. For that purpose the drive for the welding jaws is not operated at a constant speed but during each revolution is temporarily accelerated and temporarily decelerated in such a manner that the welding time in which the crank drive performs a clamping action will always have the required duration and the remaining part of each revolution of the crankshaft will be performed during the remainder of the current machine cycle time.

A further optional feature of the invention resides in that the welding device which comprises the pair of welding jaws is preceded by two pairs of pinch rollers and each of said pairs of pinch rollers are connected to a drive unit consisting of a motor and a transmission.

The motors may consist of stepping motors for operating at a speed and with separating and standstill times which are controllable by the stepping pulses which are delivered.

The operating and standstill times of the motors may be controlled by a central processing unit, which operates in accordance with suitable programs, which are not part of the present invention.

The central processing unit may be operable to control a master clock motor for delivering pulses to an electronic drive controller for controlling the motors.

Alternatively, the central processing unit may simulate a speed, and pulses derived from said simulated speed may be delivered to an electronic drive controller for controlling the motors.

BRIEF DESCRIPTION OF THE DRAWINGS

FIGS. 3a to 3d are diagrammatic side elevations showing a crank drive for driving a welding jaw with the crank shown in different angular positions for performing a clamping action.

DETAILED DESCRIPTION OF PREFERRED EMBODIMENT

Figure 1:
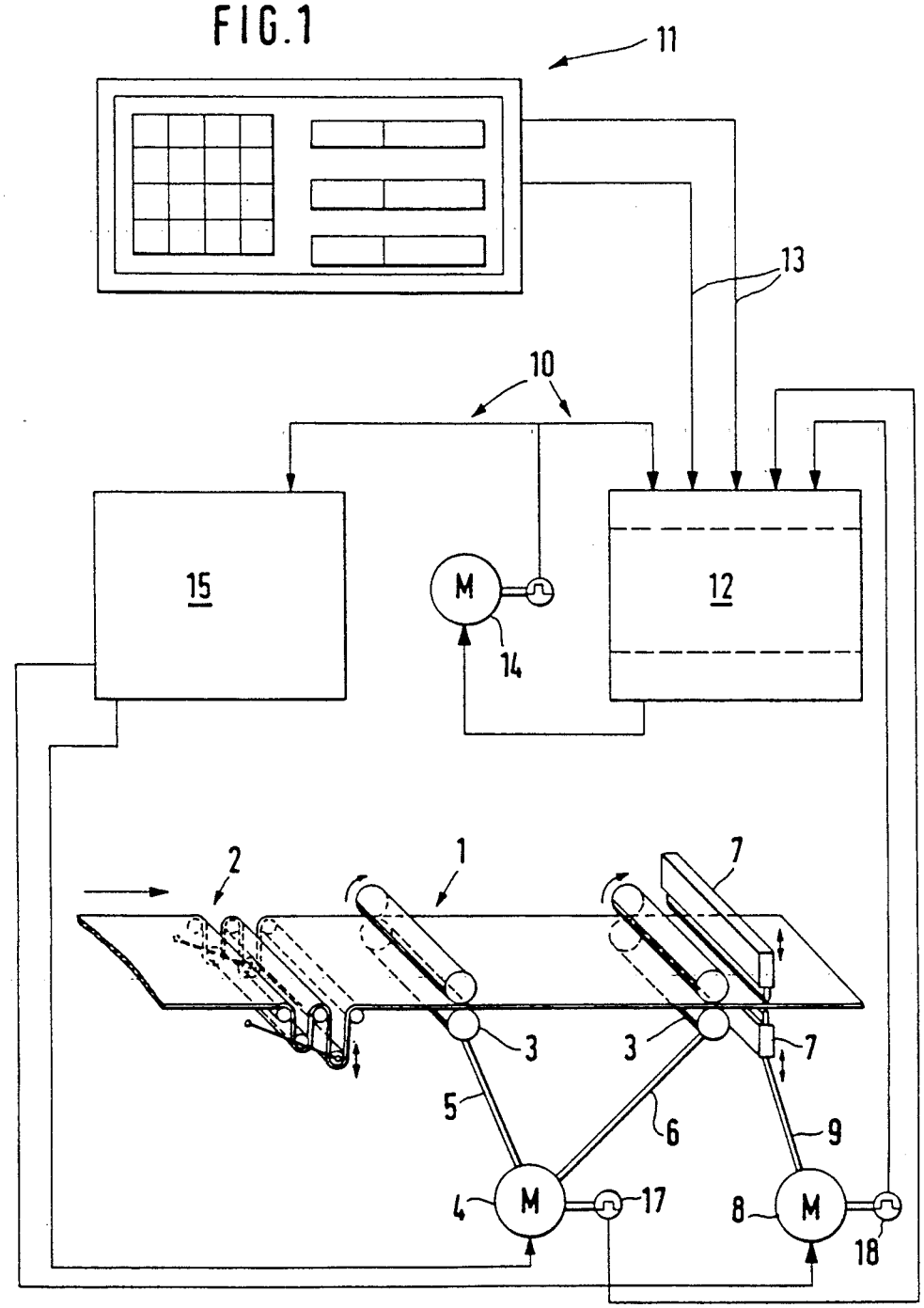
FIG. 1 is a diagrammatic perspective view of a bag or sack making machine and associated control mechanism.

Illustrative embodiments of the invention will now be described in more detail with reference to the drawing.

A machine 1 (FIG. 1) for making bags or sacks from a continuous tubular or semitubular film comprises a conventional looping buffer 2, from which the continuous film is intermittently advanced by two pairs 3 of pinch rollers in steps corresponding to the length of one film section. The two pairs of pinch rollers 3 are driven by a common stepping motor 4 via respective conventional transmissions 5, 6.

A pair of welding jaws 7 are moved in mutually opposite directions by a stepping motor 8, which is connected to the welding jaws 7 by a conventional jaw operating mechanism 9.

A central processing unit 10 is provided for controlling the operation of the stepping motors 4 and 8 for time periods which overlap each other in part. The input of data into the central processing unit is effected by means of a data input keyboard 11.

The central processing unit 10 may consist of a tiny microcomputer, which is controlled by properly adapted software, both of which are known per se.

Alternatively the central processing unit 10 may be incorporated in a central computer 12, which receives required data via the data input device 1 and data lines 13, which define, e.g., the feeding time, the welding time and the number of machine cycles per minute. In this case the central computer will determine the speed of a master clock drive 14 and will also control and monitor all functions of the machine.

The master clock drive 14 may consist of a motor which is operated at a speed that is controlled by the central computer, and an angular position encoder. The master clock drive may then control an electronic drive controller 15, which by means of stepping pulses controls the operating times of the stepping moors 4 and 8. The stepping motors 4 and 8 are provided with respective position pick-ups 17 and 18 for backfeeding the instantaneous positions of the motors 7 and 8 to the central processing unit.

Figure 2:
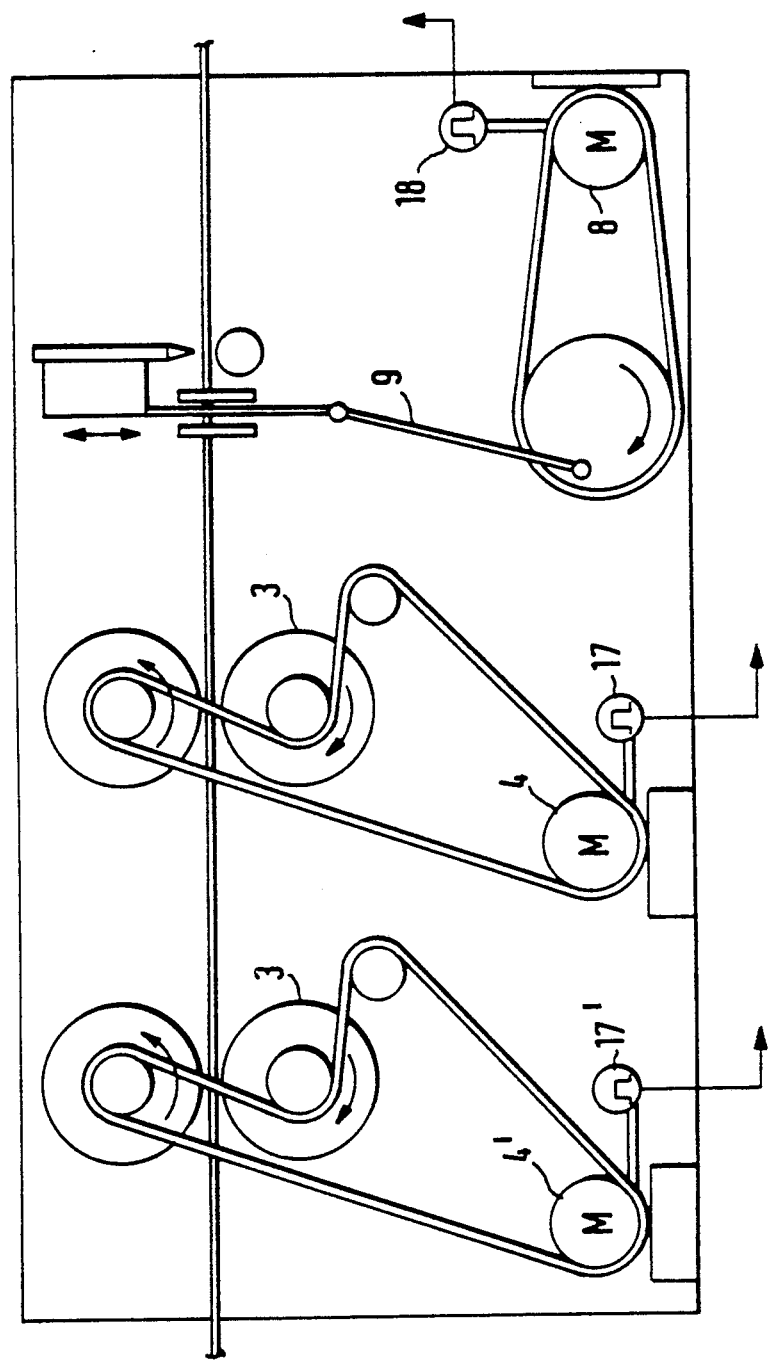
FIG. 2 is a diagrammatic side elevation sowing separate motors for driving two pairs of pinch motors and a welding device.

In the illustrative embodiment shown in FIG. 2 the two pairs 3 of pinch rollers are not driven by a common stepping motor 4 and respective interposed respective transmissions 5, as is shown in FIG. 1, but each pair 3 of pinch rollers is driven by a separate motor 4 or 4'. By the provision of two separate motors 4 and 4' for the two pairs of pinch rollers the need for inflexible transmissions is eliminated so that the two pairs of pinch rollers can be operated at different speeds in a simple manner and the desired tension can be imparted in a simple manner to the continuous film between the two pairs of pinch rollers. Again, each pair of pinch rollers and the associated motor and transmission constitute a unit, which can easily be replaced if required.

FIG. 3 shows a reciprocatory welding jaw 7', which is actuated by a crank drive and cooperates with a stationary backing jaw or backing bar 7''. In the illustrated structure, crank arm 16a is received in a recess 7a in jaw 7' with a spring 20 provided around the crank arm, so that a lost-motion connection is formed between the crank arm and jaw. In the first phase shown in FIG. 3a, the upper welding jaw 7' is clear of the backing bar 7''. In the second phase (FIG. 3b) the movable upper welding jaw 7, has just contacted the fixed backing bar 7'. In the third phase (FIG. 3c) the crankpin 16 has reached its bottom dead center. In the fourth phase (FIG. 3d) the crankpin has reached the position in which the upper welding jaw 7' is just being lifted from the fixed backing 7''. During the time from the second phase to the fourth phase, a clamping action is performed by the welding jaws as the crank performs a predetermined angular movement. It is apparent from FIG. 3 that the upper welding jaw 7' is in contact with the backing jaw 7'' from the second phase to the fourth phase, while the crankpin 16 performs a predetermined angular movement during that time, so that the clamping action which has been described is performed.

In known machines, an adjustable part of the revolution of the crankshaft has been used for welding and the remaining part of the revolution has been used to lift the welding jaw and to move it into engagement with the backing. In those machines, the crankshaft performs one revolution per machine cycle. The adjusted angular movement in which the clamping action is effected remains constant so that the actual welding time will always depend on the current cycle frequency.

In accordance with the invention, the drive motor can be controlled in such a manner that, the welding bar is not operated by a motor which is operated at a constant speed, but the motor may be accelerated and decelerated during each revolution, such that the welding time (clamping time) will always have the required duration and the remainder of each revolution is performed during the remainder of the current cycle time of the machine. Also, the motor 8 may be controlled to stop the crankshaft for a short time. As a result, the time which is required for a predetermined angular movement of the crankpin 16 can be changed as required.

It should be emphasized that the drive units may consist of motors provided with transmissions (gearmotors), or motors without associated transmissions. The pairs of pinch rollers and the other means to be driven may be driven also directly by motors.

The drive by means of stepping motors is only an example of a drive. Particulary suitable drive motors are highly dynamic asynchronous (induction) motors which can be numerically controlled by computers defining the traversing speed and the position.

Further, the welding jaws may alternatively be actuated by a linear drive. In comparison with a linear drive, however, the crank drive affords the advantage that the positioning is simplified, the motor can be operated at the highest possible speed for the moment through the position "welding" and the speed of the motor need not to be reversed for a reversal of the welding bar speed. Where a linear drive is used, the position "welding" will have to be approached with a deceleration and the motor will have to be started in the opposite direction from a standstill for the movement from the position "welding".

I claim:

1. An apparatus for making bags or sacks severed by welding from continuous tubular or semitubular films of synthetic thermoplastics, said apparatus comprising
    at least one pair of pinch rollers for feeding the continuous film,
    a first motor for driving the pinch rollers intermittently via a suitable transmission,
    a pair of welding jaws for providing the continuous film with seam welds, transverse seam welds or severed transverse seam welds,
    a second motor for actuating said pair of welding jaws via a drive mechanism, and
    a central processing unit programmed to control operation of the respective motors so that the second motor is energized at a time when the first motor is still energized to drive the pinch rollers, and after a standstill phase of the first motor the first motor is energized to operate the pinch rollers before the second motor for driving the welding jaws has stopped,
    the drive mechanism for the welding jaws comprises a crank drive for providing a cyclical clamping action of one jaw relative to another jaw and, for control of welding time, the central processing unit further being programmed to temporarily accelerate, temporarily decelerate and intermittently stop, the second motor during each revolution, and
    an electronic drive controller for controlling said first motor and said second motor by delivering pulses thereto,
    a master clock motor controlled by said central processing unit for causing said electronic drive to control the speed of the second motor for driving the crank drive so that a predetermined angular movement thereof for effecting the clamping action of the one welding jaw is performed by the crank drive over a selected time duration in each revolution, the time duration in each revolution being variable between different revolutions by accelerating, decelerating and intermittently stopping the second motor to control the perspective operating and standstill time durations of said one welding jaw.

2. An apparatus according to claim 1, which includes two pairs of the pinch rollers wherein each of said pairs of pinch rollers is connected to a separate drive unit consisting of a motor and a transmission.

* * * * *

UNITED STATES PATENT AND TRADEMARK OFFICE
CERTIFICATE OF CORRECTION

PATENT NO. : 5,002,522
DATED : March 26, 1991
INVENTOR(S) : Helmut FEUSTEL

It is certified that error appears in the above-identified patent and that said Letters Patent is hereby corrected as shown below:

At the Title Page, Line [30] should read:

[30] Foreign Application Priority Data
June 29, 1987  [DE]  Fed. Rep. of Germany ....... 3721432

Signed and Sealed this

Fifteenth Day of September, 1992

Attest:

DOUGLAS B. COMER

Attesting Officer

Acting Commissioner of Patents and Trademarks